(12) United States Patent
Lillethun et al.

(10) Patent No.: US 8,954,364 B2
(45) Date of Patent: Feb. 10, 2015

(54) HIERARCHICAL CONTEXTS TO DRIVE LIVE SENSOR APPLICATIONS

(75) Inventors: David L. Lillethun, Dunwoody, GA (US); Ajay Mohindra, Hawthorne, NY (US); Anca Sailer, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 13/236,475

(22) Filed: Sep. 19, 2011

(65) Prior Publication Data

US 2013/0074096 A1   Mar. 21, 2013

(51) Int. Cl.
| G06F 17/00 | (2006.01) |
| G06N 5/00 | (2006.01) |
| G06F 9/46 | (2006.01) |
| G06N 5/04 | (2006.01) |
| G06N 99/00 | (2010.01) |

(52) U.S. Cl.
CPC ...... *G06F 9/461* (2013.01); *G06N 5/04* (2013.01); *G06N 99/005* (2013.01)
USPC .......................................................... 706/45

(58) Field of Classification Search
CPC ........ G06N 99/005; G06N 5/04; G06F 9/461; G06F 9/3851
USPC ............................................. 706/45; 718/108
See application file for complete search history.

(56) References Cited

U.S. PATENT DOCUMENTS

| 5,390,281 A | 2/1995 | Luciw et al. |
| 5,870,730 A | 2/1999 | Furuya et al. |
| 6,021,403 A | 2/2000 | Horvitz et al. |
| 6,204,763 B1 * | 3/2001 | Sone .......................... 340/568.1 |
| 6,446,056 B1 | 9/2002 | Sadakuni |
| 6,629,242 B2 | 9/2003 | Kamiya et al. |
| 6,678,669 B2 | 1/2004 | Lapointe et al. |
| 7,269,516 B2 | 9/2007 | Brunner et al. |
| 7,362,698 B2 | 4/2008 | Christensen et al. |
| 7,555,412 B2 | 6/2009 | Nath et al. |
| 2002/0198795 A1 * | 12/2002 | Dorenbosch ................... 705/28 |
| 2004/0097797 A1 | 5/2004 | Porges et al. |
| 2004/0205048 A1 | 10/2004 | Pizzo et al. |
| 2005/0263315 A1 | 12/2005 | Marszalek et al. |
| 2006/0161645 A1 | 7/2006 | Moriwaki et al. |
| 2008/0079567 A1 | 4/2008 | Poor |
| 2008/0247313 A1 | 10/2008 | Nath et al. |
| 2008/0255434 A1 | 10/2008 | Hayter et al. |
| 2009/0222541 A1 | 9/2009 | Monga et al. |
| 2009/0276525 A1 | 11/2009 | Jo et al. |

(Continued)

OTHER PUBLICATIONS

Biegel et al., A Framework for Developing Mobile, Context-aware Applications, Proceedings of the Second IEEE Annual Conference on Pervasive Computing and Communications, 2004.*

(Continued)

*Primary Examiner* — Jeffrey A Gaffin
*Assistant Examiner* — Robert H Bejcek, II
(74) *Attorney, Agent, or Firm* — F. Chau & Associates, LLC; Louis J. Percello (57) ABSTRACT

A method for operating a sensor based application includes receiving a context hierarchy for the sensor based application, the context hierarchy comprising a plurality of contexts, wherein each of the contexts is assigned a level of interest and a priority, reading the context hierarchy and discovering at least one sensor associated with each of the plurality of contexts, and reading at least one value of each of the sensors, and applying the values.

16 Claims, 4 Drawing Sheets

(56) References Cited

U.S. PATENT DOCUMENTS

| | | |
|---|---|---|
| 2010/0145479 A1 | 6/2010 | Griffiths |
| 2010/0241465 A1 | 9/2010 | Amigo et al. |
| 2011/0044207 A1 | 2/2011 | Meyers et al. |
| 2013/0013088 A1 | 1/2013 | Liekens et al. |

OTHER PUBLICATIONS

Boulkenafed et al., Providing Hard Real-Time Guarantees in Context-Aware Applications: Challenges and Requirements, Proceedings of the 2005 Fourth IEEE International Symposium on Network Computing and Applications, 2005.*

O'Connor et al., Self-Adapting Context Definition, First International Conference on Self-Adaptive and Self-Organizing Systems, 2007.*

Korpipää et al., Managing Context Information in Mobile Devices, Pervasive Computing, IEEE vol. 2, Issue 3, Jul.-Sep. 2003.*

Gonzalez et al., Context-based Representation of Intelligent Behavior in Training Simulations, Transactions of the Society for Computer Simulation International 15. 4: 153-66. Soc. Comput. Simulation. (Dec. 1998).*

Gonzalez et al., Context-Based Representation of Intelligent Behavior in Simulated Opponents, Computer Generated Forces and Behavior Representation Conference, 1996.*

Stefanidis et al., On Supporting Context-Aware Preferences in Relational Database Systems. In: Proc. of the first International Workshop on Managing Context Information in Mobile and Pervasive Environments, in conjunction with MDM 2005, Cyprus (2005).*

IEEE paper: Delic et al., Towards an Architecture for Real-Time Decision Support Systems: Challenges and Solutions, Proc. IEEE, (IDEAS'01), Jul. 16-18, 2001.

Schilit and Theimer "Disseminating Active Map Information to Mobile Hosts". IEEE Network 8 (5): 22-32, (Sep. 1994).

Abadi, at al., "The Design of the Borealis Stream Processing Engine," in Conference on Innovative Data Systems Research (CIDR '05), Jan. 2005.

Amini at al., "SPC: A Distributed, Scalable Platform for Data Mining," in Data Mining Standards, Services and Platforms (DMSSP '06), Aug. 2006.

Hermann et al., "Deapspace: transient ad hoc networking of pervasive devices," Comput. Netw., vol. 35, No. 4, pp. 411-428, Jan. 2001.

Shneidman et al., "Hourglass: An infrastructure for connecting sensor networks and applications," Harvard University, Tech. Rep. TR-21-04, May 2004.

Gibbons et al., "Irisnet: An architecture for a worldwide sensor web," IEEE Pervasive Computing, vol. 2, No. 4, pp. 22-33, Mar. 2003.

Office Action dated Mar. 7, 2013 in U.S. Appl. No. 13/236,497.

Final Office Action dated Jul. 5, 2013 in U.S. Appl. No. 13/236,497.

Office Action dated Aug. 13, 2014 in U.S. Appl. No. 13/236,497.

\* cited by examiner

HIERARCHICAL CONTEXTS TO DRIVE LIVE SENSOR APPLICATIONS

BACKGROUND

1. Technical Field

The present disclosure relates to live sensor applications, and more particularly, to a system and protocol for using hierarchical contexts to drive live sensor applications.

2. Discussion of Related Art

Live sensor applications use live, possibly streaming data from sensors to achieve a goal. Live sensor applications may have many sensors available to them, and may use different subsets of those sensors to achieve the goal in different contexts. Such contexts may be determined by the real-world state, and sensors are the devices that give the application the ability to sense that state, or portions thereof.

BRIEF SUMMARY

According to an embodiment of the present disclosure, a method for operating a sensor based application includes receiving a context hierarchy for the sensor based application, the context hierarchy comprising a plurality of contexts, wherein each of the contexts is assigned a level of interest and a priority, reading the context hierarchy and discovering at least one sensor associated with each of the plurality of contexts, and reading at least one value of each of the sensors, and applying the values.

According to an embodiment of the present disclosure, a computer program product for executing a sensor based application includes a computer readable storage medium having computer readable program code embodied therewith for receiving a context hierarchy for the sensor based application, the context hierarchy comprising a plurality of contexts, wherein each of the contexts is assigned a level of interest and a priority, reading the context hierarchy and discovering at least one sensor associated with each of the plurality of contexts, and reading at least one value of each of the sensors, and applying the values.

According to an embodiment of the present disclosure, a system includes a device in communication with a plurality of sensors, wherein the device receives a context hierarchy for a sensor based application, the context hierarchy comprising a plurality of contexts, wherein each of the contexts is assigned a level of interest and a priority, reads the context hierarchy and discovers at least one sensor of the plurality of sensors associated with each of the plurality of contexts, and reads at least one value of each of the sensors, wherein the device applies the values.

BRIEF DESCRIPTION OF THE SEVERAL VIEWS OF THE DRAWINGS

The above and other features of the present disclosure will become more apparent by describing in detail exemplary embodiments thereof with reference to the accompanying drawings, in which.

DETAILED DESCRIPTION

According to exemplary embodiments of the present disclosure, a method for determining the current context of an application using a hierarchy of partial contexts uses an application context to assist in discovering the sensors that are currently needed to meet a goal. Partial contexts in the hierarchy may be used to discover the sensors that are needed for the application to determine the context in the next level lower in the hierarchy.

According to exemplary embodiments of the present disclosure, a context is a collection of attributes, specified as name/value pairs, that define a scope of a query.

Sensors may monitor physical or environmental conditions, such as temperature, sound, vibration, pressure, motion or pollutants, for example. Sensors may include radio-frequency identification tags, positioning systems, light sensors, motion sensors, web applications, including for example, stock applications, weather applications, social applications, and traffic control devices, including cameras and speed detectors, etc. An example of a simple sensor may be a device that measures a physical quantity and converts it into a signal that can be read by an observer or by an instrument. In the above mentioned traffic context, an infrared traffic logger may be used as a sensor.

The concept of context aware systems emerged out of ubiquitous computing research. The term "context-aware" is used to describe a model of computing in which users interact with different mobile and stationary computers and classify a context-aware system as one that can adapt according to its location of use, the collection of nearby people and objects, and changes to those objects over time.

Organizing contexts into a hierarchy can help applications to discover a set or sets of sensors needed to use in a current context. For example, according to exemplary embodiments of the present disclosure, a sensor registry may be organized into a hierarchy allowing applications to use queries to locate sensors needed by the applications. The sensor registry may provide the applications with detailed information regarding the sensors, allowing the applications to make informed decisions in regards to which sensors to use.

According to exemplary embodiments of the present disclosure, a hierarchical context is a context that also contains other contexts in its definition.

Each level of the hierarchy may include a set of partial contexts. Each node in the hierarchy is a partial context, and partial contexts may be described by the path from the root of the hierarchy to that node (e.g., User/Location or User/Location/Home/Kitchen). Furthermore, each partial context in the hierarchy may be assigned a level of interest. The partial contexts in the hierarchy and their levels of interest may be modified dynamically by a user, an application, or other partial contexts in the hierarchy.

Hierarchical contexts allow privacy settings to be applied to partial contexts in the hierarchy. In one example, a privacy setting may be enforced by storing sensitive context information on the user's personal device, and not sharing that information with applications running on another device, while more public information in the hierarchy may be stored in another location, such as public storage or a cloud device, where the information can be shared with applications running in a variety of locations.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA™, a Smalltalk programming language variant, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to exemplary embodiments of the present disclosure, a method for determining a current context of an application using a hierarchy of partial contexts uses an application context to assist in discovering which sensors are currently needed to meet a goal. Partial contexts in the hierarchy may be used to discover which sensors are needed for the application to determine the context in the next level lower in the hierarchy.

For example, a device storing a hierarchy reflecting a user's interests may receive sensor or streaming data such as global positioning location data, such as that provided by the Global Positioning System (GPS). The device may convey information to a user based on the hierarchy.

Figure 1:
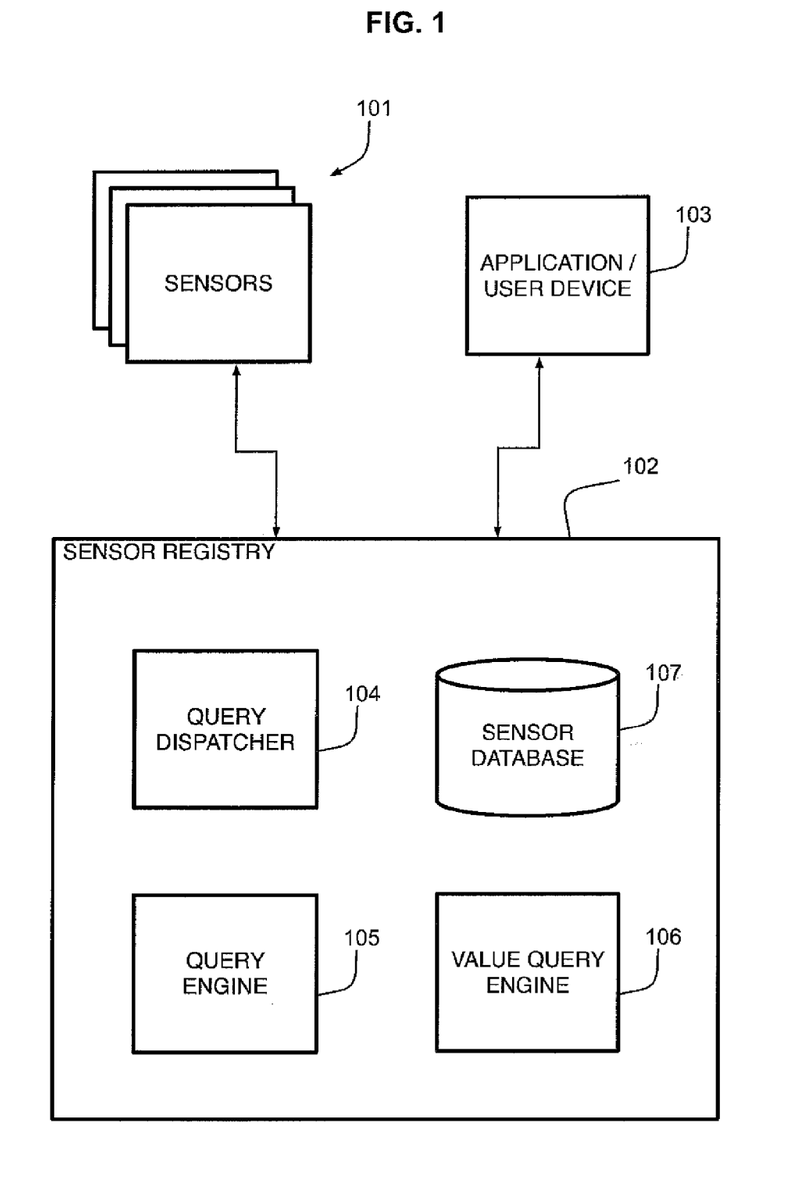
FIG. 1 is a sensor registry according to an embodiment of the present disclosure.

According to an exemplary embodiment of the present disclosure, sensors are deployed in a network as shown in FIG. 1. The sensor network includes a plurality of sensors 101. The plurality of sensors 101 may include various types of sensors. In an exemplary embodiment, the sensor network is dynamic, and a sensor registry 102 is configured to interface with the dynamic sensor network. For example, the sensor registry 102 handles dynamic changes when they occur, such as, for example, allowing new sensors to register themselves in the sensor registry 102 when they are added to the sensor network, and allowing sensors to go offline when they are not functioning. When changes are made in the sensor registry 102, the sensor registry 102 notifies an application 103 of changes to the result sets of queries that were previously made. The application 103 maintains a context hierarchy related to the sensors and data as described with reference to FIGS. 2 and 3. Queries made by an application 103 may be continuous, as they continue monitoring sensors that match the query for the life of the application. In addition, the application 103 is also dynamic. For example, queries made by an application may change as the application 103 runs. These dynamic queries are handled by the sensor registry 102. In addition to performing dynamic queries, the application 103 may also perform nested queries and intentional queries. Applications may run on various devices including, for example, a desktop computer or a handheld device such as a smartphone.

Applications may also run in a cloud environment and devices may access the applications via an Internet connection such as, for example, a Wi-Fi connection, a Third Generation (3G) cellular connection including, for example, an Evolved High-Speed Packet Access (HSPA+) connection, or a Fourth Generation (4G) cellular connection including, for example, a Long Term Evolution (LTE) connection or a Worldwide Interoperability for Microwave Access (WiMax) connection.

In FIG. 1, a sensor database 107 may store sensor metadata corresponding to the sensors 101 in an area (e.g., a city). A query dispatcher 104 may handle all application requests, checks queries against sensor metadata stored in the sensor database 107, dispatches queries to, for example, a query engine 105 and a value query engine 106, and handles dynamic and nested queries.

Figure 2:
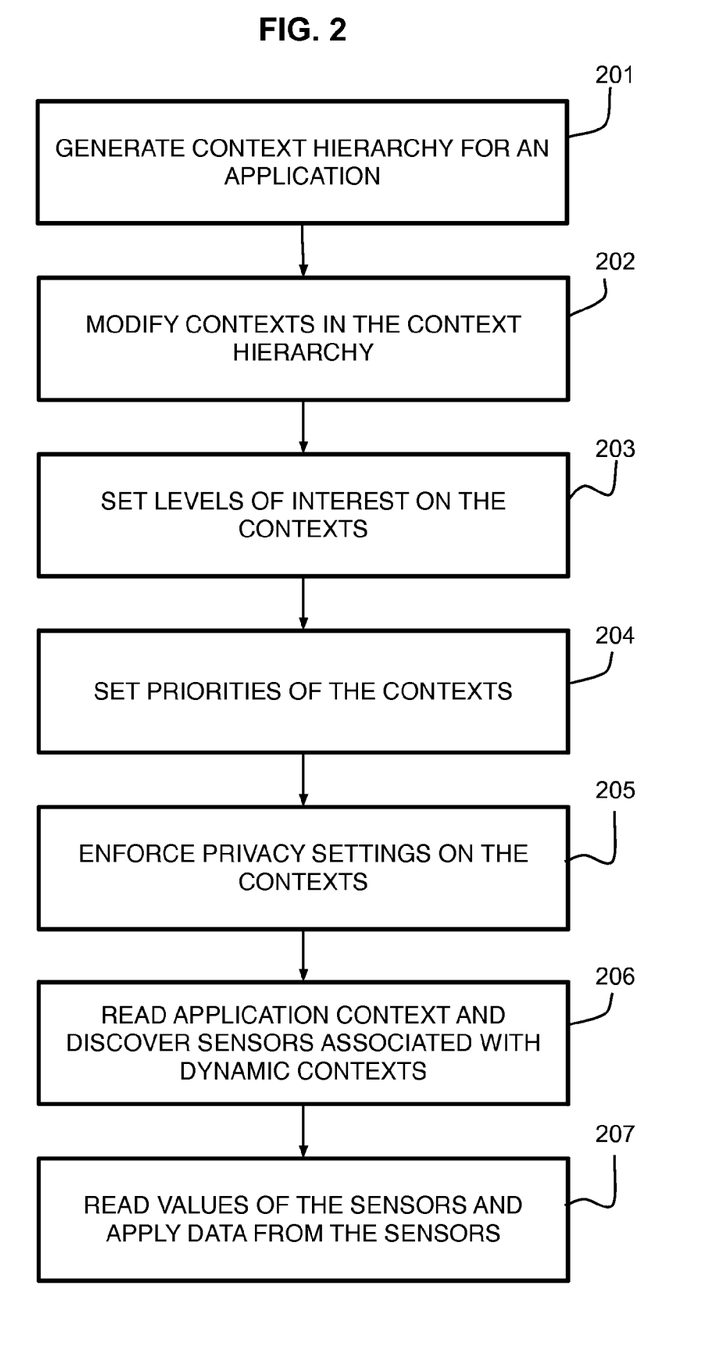
FIG. 2 is a flow diagram of a method for driving a live sensor application according to an embodiment of the present disclosure.
Figure 3:
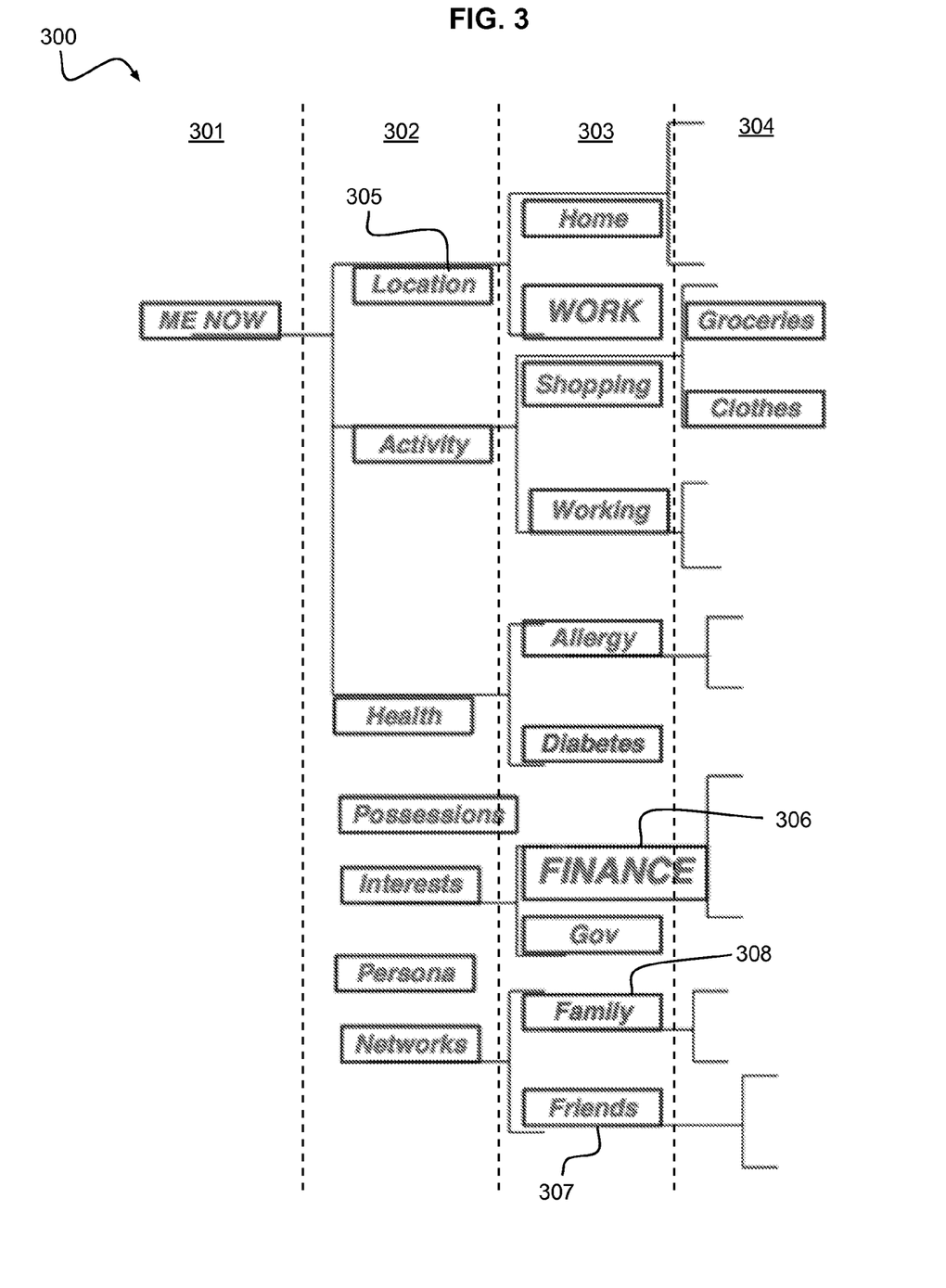
FIG. 3 is an exemplary context hierarchy according to an embodiment of the present disclosure.

Referring to FIG. 2, a context hierarchy is generated for the application (201). An exemplary context hierarchy 300 is shown in FIG. 3. The context hierarchy may be generated by associating each context in the hierarchy with one parent context in the level above it and associating a set of sensors relevant to the context to each dynamic context. It should be noted that contexts at a highest level do not have a parent context and therefore are not associated with a parent context.

The hierarchy of FIG. 3 includes four levels 301-304, and each level contains one or more partial contexts, wherein the nodes in the hierarchy are the partial contexts.

Although not shown in the figures, in an exemplary hierarchy, different colors and text sizes may indicate the user's relative interest in different contextual aspects. Weights may be associated with the different contextual aspects. For example, for a diabetic user where health is assumed to have a relatively large weight, food advertisements may be filtered using metadata indicative of ingredients of a product. In another example, for a user working in financing, market ads may be filtered based on stocks in the user's portfolio. In yet another example, for a traveling user, a weather forecast for a GPS detected location may be provided with higher frequency.

In view of the foregoing, weights may be used to affect incoming data to a user's device. The use may update the hierarchy and contextual aspects through, for example, a preference or through use, e.g., wherein weights are updated according to observed use of a device.

Referring now to an exemplary hierarchy, a node, e.g., a location node 305, associated with a sensor such as a global positioning device, corresponds to a dynamic context. A node that is not associated with a sensor corresponds to a static context. The collection of all current contexts is also known as the application context. In FIG. 3 text size represents a relative level of interest, e.g., with a finance node 306 having greater interest than a friends node 307, and, although not shown in the figures, shading may be used to represent priority, e.g., wherein a family node 308 has priority over the location node 305.

The initial context hierarchy may be constructed by the user or dynamic contexts within the hierarchy may read sensors in order to automatically detect the real-world context and fill in child contexts accordingly.

The application context may be modified dynamically by the user, and/or by contexts modifying their child contexts (202), possibly using the data from sensors associated with that context to make the decision. That is, a dynamic context may examine the values of its sensors and use that information to modify its child contexts. For example, in an exemplary case of a shopping application, a partial context Possessions may have a child dynamic context Refrigerator, which has child contexts for all of the items in the user's refrigerator. The Refrigerator partial context may have sensors in the refrigerator associated with it, and by examining them determines when items are consumed or added to the refrigerator. When an item is consumed or added, the Refrigerator may remove or add child contexts corresponding to those items.

At any point, the user may modify the context hierarchy. Dynamic contexts within the hierarchy may modify their child contexts as sensor readings dynamically change.

The user or dynamic contexts may assign sets of sensors to dynamic contexts in the hierarchy. The assignment of the sensors may be performed at any time, including without the benefit of a generated hierarchy.

According to an exemplary embodiment, sensors may be described by metadata. The description may include sensor type, location, etc. A query on the sensor metadata may be used to describe the set of sensors associated with a particular dynamic context. For example, "SELECT*FROM Sensors WHERE type='food tracker' AND location='refrigerator'" could be used to describe the sensors associated with the User/Possessions/Refrigerator dynamic context.

Levels of interest may be set on the contexts by the user, by applications, and/or by contexts indicating interest in other contexts in the hierarchy (203), possibly using the data from sensors associated with that context to make the decision.

Each partial context has a level of interest, e.g., indicated by text size in FIG. 3. The level of interest may be a default level of interest, or may be a level of interest set by the user, an application or by other dynamic contexts in the hierarchy. Partial contexts may also set the level of interest for other contexts, but not above its own level of interest. Applications may be assigned levels of interest by the user, and they may not assign levels of interest for contexts above their own levels of interest. Thus, control over interest lies with the user.

Levels of interest may be set at any time to modify and update levels of interest on any partial context(s). Dynamic may not set the level of interest any higher than their own levels of interest. The user may assign levels of interest to applications, and applications then may not set the level of interest of any partial context higher than their own levels of interest.

Priorities may be set on the contexts (204). The priorities may be used to optimize performance and resource management. For example, priorities may be set by the user, by applications, and/or by contexts indicating the importance of other contexts. Priorities may also be adjusted automatically, for example decaying the priority over time for contexts who are not used or whose sensors are not used.

Each partial context also has a priority associated with it, although not shown in the figures, priority may be indicated by shading. The priority may be a default priority, or may be a priority set by the user or an application. Partial contexts may also set the priority of other partial contexts, but not above their own priority. For example, the user may assign priorities to applications, and applications then may not set the priorities of any context higher than their own levels of interest. Priorities may by automatically adjusted. For example, a priority may decay over time for contexts or sensors that are not being used.

Privacy settings may be enforced on the various contexts in the hierarchy, and allow the user to set and customize the privacy settings (205). The user may assign privacy settings to the context hierarchy and the partial contexts within it. The privacy settings may prevent certain partial contexts and the sensors associated with them from being shared with other devices or applications running on other devices outside the user's own.

The application may read the application context from the context hierarchy and discover the sensors associated with the dynamic contexts (206). Sensor discovery may be performed according to the exemplary method described with reference to FIG. 1, but is not limited thereto. For example, sensor discovery may include discovering local sensors directly by a device using, for example, radio frequency communication, including BLUETOOTH™ short-range wireless connectivity and the like. The application may be programmed to examine all or only certain partial contexts in the hierarchy. The application may be programmed to use the sensors associated with all or only some of the dynamic contexts it examined.

The application may read the values of the sensor(s) discovered at block 206, and apply data collected by the relevant sensor(s) (207). It should be understood that the application of the data may be performed in furtherance of the applications purpose, e.g., decision making in a decision support system (DSS), navigation, presenting data in a prioritized manner, etc.

The flowcharts and block diagrams in the figures illustrate the architecture, functionality, and operation of possible implementations of systems, methods and computer program products according to various exemplary embodiments of the present disclosure. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 4:
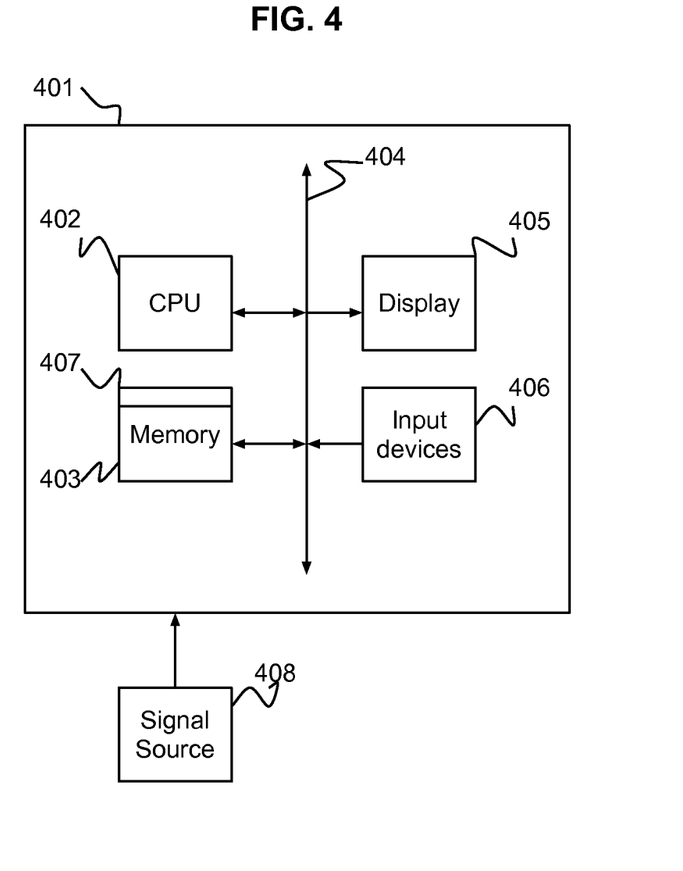
FIG. 4 is a computer system for implementing a method of dynamically querying sensor data collections according to an exemplary embodiment of the present disclosure.

More particularly, referring to FIG. 4, according to an exemplary embodiment of the present disclosure, a computer system 401 for dynamically querying sensor data collections can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. Exemplary embodiments of present disclosure may be implemented as a routine 407 stored in memory 403 (e.g., a non-transitory computer-readable storage medium) and executed by the CPU 402 to process the signal from the signal source 408, e.g., a sensor. As such, the computer system 401 is a general-purpose computer system that becomes a specific purpose computer system when executing the routine 407 of the present disclosure.

The computer platform 401 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device.

Having described exemplary embodiments for a system and protocol for dynamically querying sensor data collections, it is noted that modifications and variations can be made by persons skilled in the art in light of the above teachings. It is therefore to be understood that changes may be made in exemplary embodiments of the disclosure, which are within the scope and spirit of the disclosure as defined by the appended claims. Having thus described exemplary embodiments of the disclosure with the details and particularity required by the patent laws, what is claimed and desired protected by Letters Patent is set forth in the appended claims.

What is claimed is:

1. A method of driving a sensor based application, comprising:
   generating a context hierarchy for the sensor based application,
   wherein the context hierarchy comprises a plurality of contexts, each context being either a static context having no associated sensors from a sensor network or a dynamic context having at least one associated sensor from the sensor network, wherein the plurality of contexts includes at least one static context and at least one dynamic context;
   discovering a set of sensors from the sensor network using the context hierarchy, wherein each sensor included in the discovered set of sensors is associated with a dynamic context from among the plurality of contexts, wherein the discovered set of sensors includes only sensors from the sensor network that are needed to meet a goal of the sensor based application;
   reading data values from the discovered set of sensors;
   applying the data values read from the discovered set of sensors in the sensor based application;
   setting a priority for the at least one dynamic context of the plurality of contexts,
   wherein the priority of the at least one dynamic context is set by a superior context within the context hierarchy, and the priority does not exceed a priority of the superior context; and
   adjusting the priority of the at least one dynamic context based on an amount of use of the at least one associated sensor corresponding to the at least one dynamic context.

2. The method of claim 1, further comprising:
   setting a level of interest for each of the plurality of contexts,
   wherein the level of interest of at least one of the plurality of contexts is set by the superior context within the context hierarchy, and the level of interest does not exceed a level of interest of the superior context.

3. The method of claim 2, wherein the level of interest of another one of the plurality of contexts is set directly by a user.

4. The method of claim 1, wherein the priority of another one of the plurality of contexts is set directly by a user.

5. The method of claim 1, further comprising:
   reading data values of sensors from the sensor network associated with a parent context, wherein the parent context is a dynamic context; and
   modifying a child context of the parent context, automatically by the parent context, based on the data values of the sensors from the sensor network associated with the parent context.

6. The method of claim 5, wherein modifying the child context comprises adding the child context to the context hierarchy.

7. The method of claim 5, wherein modifying the child context comprises removing the child context from the context hierarchy.

8. The method of claim 1, wherein adjusting the priority of the at least one dynamic context comprises decaying the priority over time in response to the amount of use of the at least one associated sensor corresponding to the at least one dynamic context decreasing.

9. A computer program product for driving a sensor based application, the computer program product comprising a non-transitory computer readable storage medium having program instructions embodied therewith, the program instructions executable by a processor to cause the processor to perform a method comprising:

generating a context hierarchy for the sensor based application,
wherein the context hierarchy comprises a plurality of contexts, each context being either a static context having no associated sensors from a sensor network or a dynamic context having at least one associated sensor from the sensor network, wherein the plurality of contexts includes at least one static context and at least one dynamic context;
discovering a set of sensors from the sensor network using the context hierarchy, wherein each sensor included in the discovered set of sensors is associated with a dynamic context from among the plurality of contexts,
wherein the discovered set of sensors includes only sensors from the sensor network that are needed to meet a goal of the sensor based application;
reading data values from the discovered set of sensors;
applying the data values read from the discovered set of sensors in the sensor based application;
setting a priority for the at least one dynamic context of the plurality of contexts,
wherein the priority of the at least one dynamic context is set by a superior context within the context hierarchy, and the priority does not exceed a priority of the superior context; and
adjusting the priority of the at least one dynamic context based on an amount of use of the at least one associated sensor corresponding to the at least one dynamic context.

10. The computer program product of claim 9, wherein the method further comprises:
setting a level of interest for each of the plurality of contexts,
wherein the level of interest of at least one of the plurality of contexts is set by the superior context within the context hierarchy, and the level of interest does not exceed a level of interest of the superior context.

11. The computer program product of claim 10, wherein the level of interest of another one of the plurality of contexts is set directly by a user.

12. The computer program product of claim 9, wherein the priority of another one of the plurality of contexts is set directly by a user.

13. The computer program product of claim 9, wherein the method further comprises:
reacting data values of sensors from the sensor network associated with a parent context, wherein the parent context is a dynamic context; and
modifying a child context of the parent context, automatically by the parent context, based on the data values of the sensors from the sensor network associated with the parent context.

14. The computer program product of claim 13, wherein modifying the child context comprises adding the child context to the context hierarchy.

15. The computer program product of claim 13, wherein modifying the child context comprises removing the child context from the context hierarchy.

16. The computer program product of claim 9, wherein adjusting the priority of the at least one dynamic context comprises decaying the priority over time in response to the amount of use of the at least one associated sensor corresponding to the at least one dynamic context decreasing.

* * * * *